(12) United States Patent
Tabuchi et al.

(10) Patent No.: US 11,223,767 B1
(45) Date of Patent: Jan. 11, 2022

(54) METHODS AND APPARATUS FOR OPTICAL IMAGE STABILIZATION

(71) Applicant: SEMICONDUCTOR COMPONENTS INDUSTRIES, LLC, Phoenix, AZ (US)

(72) Inventors: Yoshihisa Tabuchi, Gifu (JP); Tomofumi Watanabe, Gifu (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 17/249,256

(22) Filed: Feb. 25, 2021

Related U.S. Application Data

(60) Provisional application No. 63/199,256, filed on Dec. 16, 2020.

(51) Int. Cl.
*H04N 5/232* (2006.01)
*H04N 5/225* (2006.01)

(52) U.S. Cl.
CPC ....... *H04N 5/23287* (2013.01); *H04N 5/2254* (2013.01); *H04N 5/23258* (2013.01)

(58) Field of Classification Search
CPC .................. H04N 5/23287; H04N 5/2254
See application file for complete search history.

(56) References Cited

U.S. PATENT DOCUMENTS

| | | | |
|---|---|---|---|
| 2003/0107338 A1 | 6/2003 | Kokami et al. | |
| 2013/0154738 A1* | 6/2013 | Lee | H03G 3/002 330/254 |
| 2015/0350507 A1 | 12/2015 | Topliss et al. | |
| 2017/0041552 A1* | 2/2017 | Calpe Maravilla | G03B 3/10 |
| 2017/0302853 A1* | 10/2017 | Shigeoka | H04N 5/243 |

FOREIGN PATENT DOCUMENTS

| | | |
|---|---|---|
| JP | H08195045 A | 7/1996 |
| JP | 2003050414 A | 2/2003 |

* cited by examiner

*Primary Examiner* — Christopher K Peterson
(74) *Attorney, Agent, or Firm* — Dickinson Wright PLLC

(57) ABSTRACT

Various embodiments of the present technology may provide methods and apparatus for optical image stabilization. A system may include an actuator control circuit responsive to a sensor and a feedback signal from an actuator. The actuator control circuit may be configured to calibrate a gain applied to a drive signal based on a measured difference value of the feedback signal generated by the actuator control circuit and a predetermined difference value.

20 Claims, 11 Drawing Sheets

METHODS AND APPARATUS FOR OPTICAL IMAGE STABILIZATION

CROSS-REFERENCE TO RELATED APPLICATION

This application claims the benefit of U.S. Provisional Patent Application Ser. No. 63/199,256, filed on Dec. 16, 2020, and incorporates the disclosure of the application in its entirety by reference.

BACKGROUND OF THE TECHNOLOGY

Many electronic devices have an imaging system integrated within them, and in some cases, the electronic device may be turned and/or rotated for the purpose of a desired image capture. In many cases, the imaging system may be controlled by an optical imaging stabilization (OIS) system. In particular, the OIS system may operate to stabilize various components of the imaging system, such as a lens, and to correct for involuntary movements of the electronic device caused by external disturbances, for example movements caused by a shaking hand (hand tremors). However, as the position of the electronic device changes, gravity may influence the optical image stabilization system and/or a position of the lens. In addition, as the electronic device ages, deterioration may further influence the optical image stabilization system and/or the position of the lens. This influence may be due, in part, to how the stroke sensitivity of various components in the imaging system, such as coils, magnets, springs, etc. varies over time. As a result, given a particular position instruction (code) associated with a respective target position and drive signal, the magnitude of the drive signal needed to move the lens to the target position may be different than the one specified by the position instruction value (code).

SUMMARY OF THE TECHNOLOGY

Various embodiments of the present technology may provide methods and apparatus for optical image stabilization. A system may include an actuator control circuit responsive to a sensor and a feedback signal from an actuator. The actuator control circuit may be configured to calibrate a gain applied to a drive signal based on a measured difference value of the feedback signal generated by the actuator control circuit and a predetermined difference value.

BRIEF DESCRIPTION OF THE FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various acceleration sensors, actuators, actuator control circuits, amplifiers, attenuators, circuitry, coils, controllers, current sources, drivers, filters, sensors, image sensors, lens, logic gates, magnets, processors, sensors, semiconductor devices, such as transistors, capacitors, and the like, signal generators, and voltage sources, which may carry out a variety of functions. In addition, the present technology may be integrated in any number of electronic systems, such as imaging systems, automotive, aviation, "smart devices," portables, medical, scientific, surveillance, and consumer electronics, and the systems described are merely exemplary applications for the technology.

The present technology may be used in conjunction with any position sensor circuit that may benefit from gravity and stroke sensitivity compensation, such as a position sensor used for motor control and a sensor used for detecting the orientation of a cell phone. Further, the present technology may employ any number of conventional techniques for capturing image data, converting data signals, filtering data signals, generating driver signals, and the like.

Methods and apparatus for optical image stabilization according to various aspects of the present technology may be integrated within any suitable electronic device or system, such as imaging systems, "smart devices," wearables, consumer electronics, and the like. According to various embodiments, the present technology may determine an orientation of the electronic device, generate an orientation signal, and apply an appropriate gain value to the orientation signal for the determined orientation.

Figure 1:
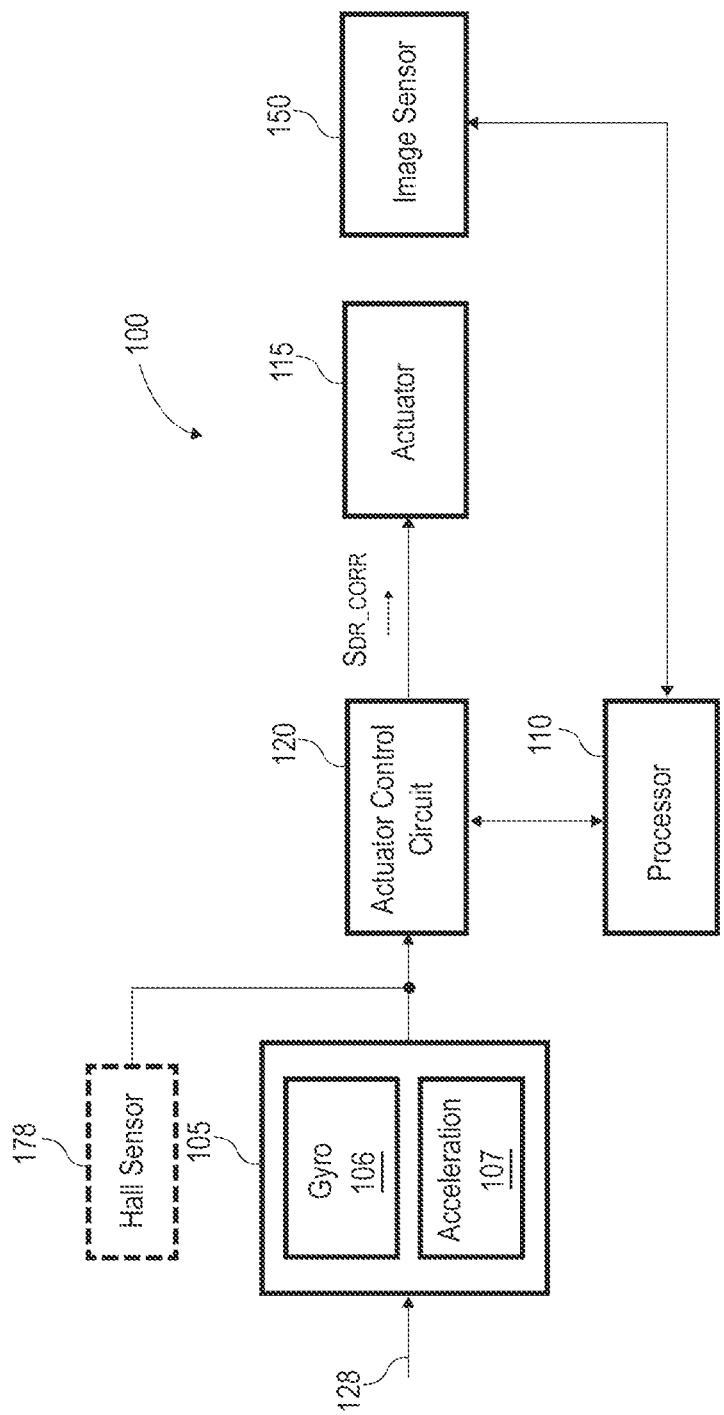
FIG. 1 is a block diagram of an optical image stabilization system in accordance with an exemplary embodiment of the present technology.
Figure 6:
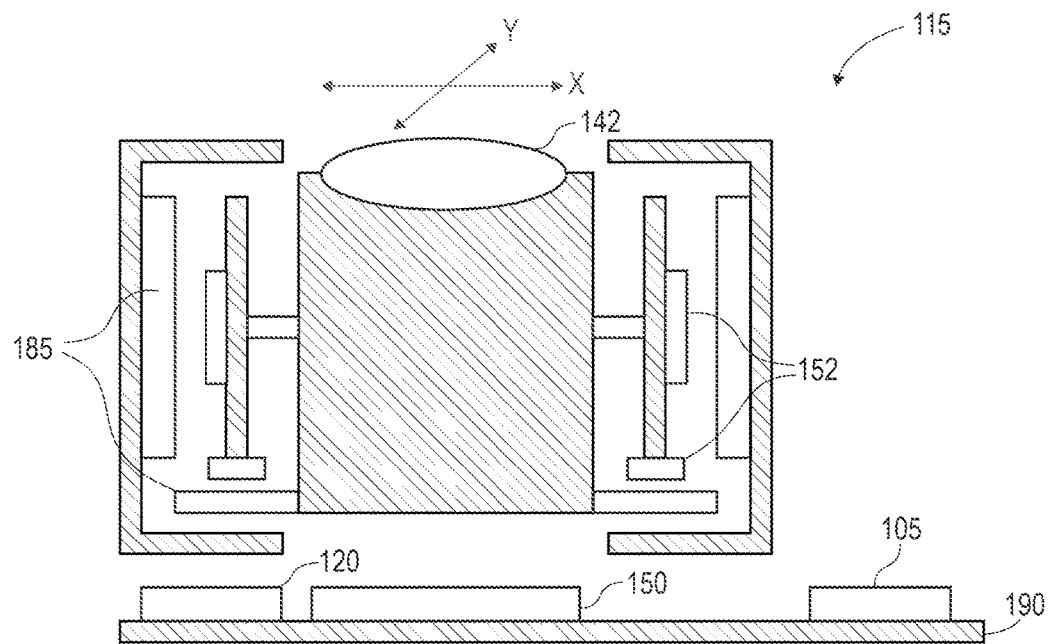
FIG. 6 representatively illustrates an actuator in accordance with an exemplary embodiment of the present technology.
Figure 7:
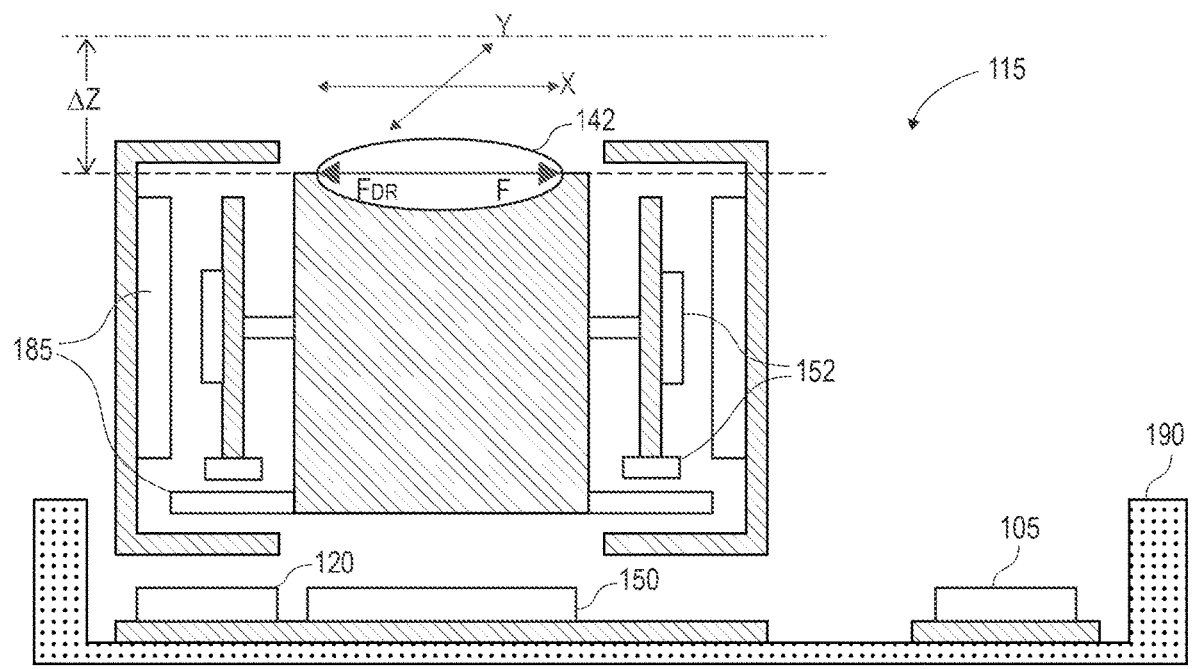
FIG. 7 representatively illustrates an actuator in accordance with an exemplary embodiment of the present technology.
Figure 8:
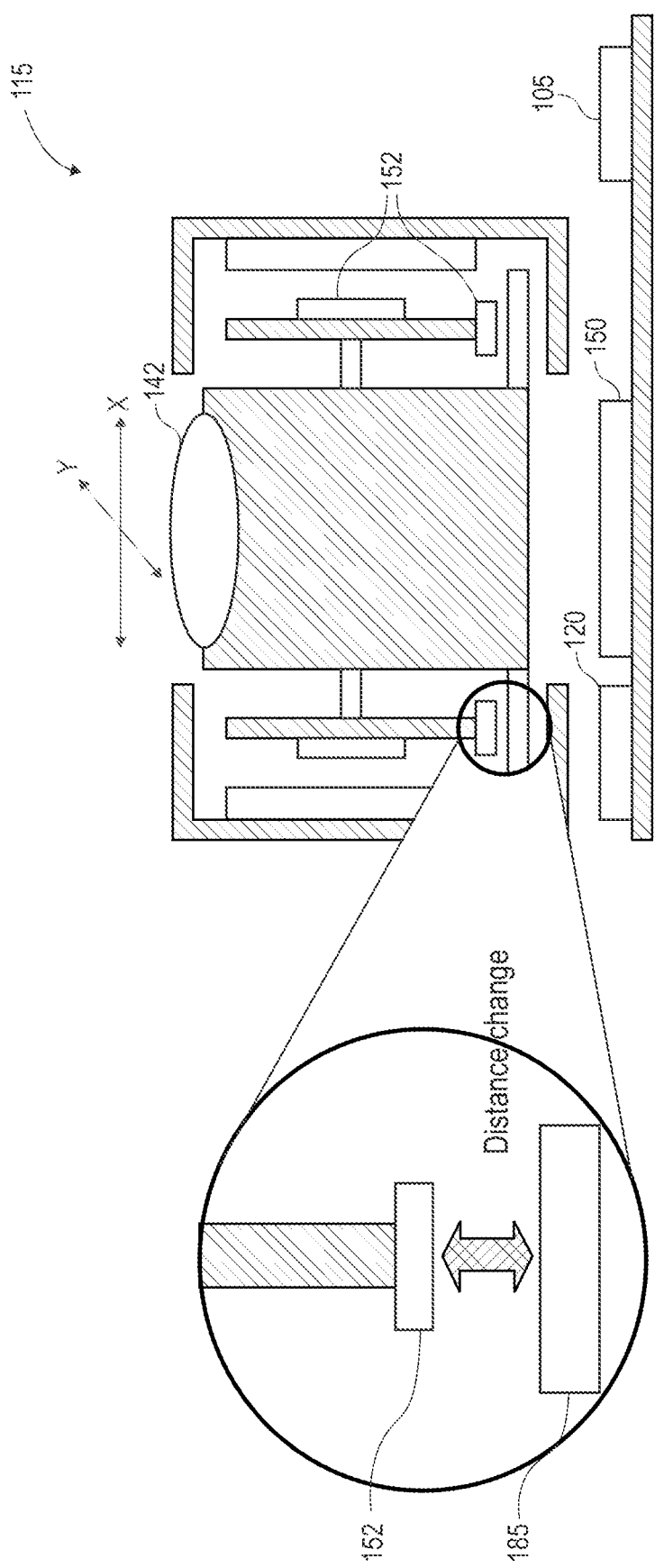
FIG. 8 representatively illustrates a change in distance between two components of a portion of the actuator in accordance with an exemplary embodiment of the present technology.

Referring to FIG. 1, an exemplary system 100 may be integrated in any suitable electronic device that comprises an image sensor 150, such as a cell phone, tablet, and the like. In various applications, the system 100 may operate to stabilize various components of the imaging system, such as a lens 142 (e.g., as illustrated in FIGS. 6-8), and to correct for movements of the cell phone, for example movements caused by involuntary movements, such as hand tremors, or voluntary movements, such as position changes to the electronic device. In the present application, the system 100 may be referred to as an optical image stabilization (OIS) system. According to various embodiments, the system 100 may comprise a sensor 105, an actuator 115, and an actuator control circuit 120. The system 100 may further comprise a processor 110. In an exemplary embodiment, and referring to FIG. 2, the system 100 may be configured as an open-loop system. However, the system 100 may also be configured as a closed-loop system (not shown).

The sensor 105 may be configured to measure the orientation, rotation, motion, and/or angular velocity of the electronic device and generate a corresponding signal. The signal may be an analog signal. In particular, the sensor 105 may detect a disturbance signal 128, such as a vibration, or the like, applied to the system 100 and generate a signal in response to detecting the disturbance signal 128. The sensor 105 may comprise a gyro sensor 106 and/or an acceleration sensor 107. The disturbance signal 128 may be applied to the system 100 in an x-, y-, and/or a z-axis direction, where the x-axis direction and the y-axis direction may each be defined to be orthogonal to the z-axis direction.

The sensor 105 may be connected to the actuator control circuit 120 and configured to transmit the signal to the actuator control circuit 120. The signal may comprise a first signal corresponding to an acceleration of the device (i.e., an acceleration signal $S_{ACC}$) or a second signal corresponding to an angular velocity of the device (i.e., a velocity signal $S_{VEL}$). The acceleration signal $S_{ACC}$ may comprise x-, y-, and/or z-components, each corresponding to an axis of an x-y-z reference coordinate system. Similarly, the velocity signal $S_{VEL}$ may comprise x-, y-, and/or z-components, each corresponding to an axis of the x-y-z reference coordinate system.

The sensor 105 may comprise any suitable sensor system or device configured to detect motion, rotation, and/or angular velocity produced by external disturbances and generate a corresponding electrical signal. The sensor 105 may be selected according to a particular application. For example, the sensor 105 may be selected according to various specifications, such as sensing range, output type, supply current, operating temperature, and the like. In one embodiment, the sensor 105 may be mounted on the electronic device and formed on a separate substrate from the actuator control circuit 120. In another embodiment, the sensor 105 may be formed on the same substrate as the actuator control circuit 120. The substrate may be any suitable substrate, such as a printed circuit board (PCB).

The actuator 115 may be configured to move the lens 142 along various axes (e.g., x-, y-, and/or z-axes), for example, to improve image quality. The actuator 115 may comprise any suitable device or system capable of moving and/or repositioning the lens 142 in response to a signal. The actuator 115 may correct for involuntary movements of the lens 142 caused by the disturbance signal 128, and may also stabilize imaging by driving the lens 142 in a direction opposite that of the disturbance signal 128 to prevent image blurring. For example, and referring now to FIGS. 6-8, the actuator 115 may be configured as a voice coil motor, comprising a magnet 185 and a coil 152 that is responsive to a drive signal $S_{DR}$ sent from the actuator control circuit 120. The actuator 115 may generate a drive force $F_{DR}$ corresponding to the drive signal $S_{DR}$ and apply the drive force $F_{DR}$ to the lens 142 to position the lens 142 along the x-, y-, and/or z-axis directions. The lens 142 may be moved or otherwise repositioned to correct for any displacement/deviations caused by the disturbance signal 128. The actuator 115 may be limited in the amount of movement it can perform, whether self-limiting or due to the design of the system. For example, the lens 142 may be enclosed in a housing (not shown) with sidewalls. As such, a maximum range of movement the actuator 115 may impart to the lens 142 may be limited by the interior dimensions of the housing.

The lens 142 may comprise any lens or lens system suitable for focusing light on the image sensor 150. For example, in various embodiments, the lens 142 may comprise a single lens element. Alternatively, the lens 142 may comprise a plurality of lens elements arranged adjacent to each other. The lens 142 may operate in conjunction with the actuator 115 and the actuator control circuit 120 to provide the optical image stabilization function. For example, the lens 142 may be configured to move along a plane that is parallel to the sensing surface of the image sensor 150 (i.e., up and down, side-to-side). The lens 142 may be formed using any suitable material, such as glass, quartz glass, fluorite, germanium, meteoritic glass, polycarbonate, plastic, high-index plastic, and the like, or any combination thereof.

The processor 110 may be configured to perform the various processing operations of the system 100, including the processing operations associated with calibrating the drive signal $S_{DR}$. In various embodiments, the processor 110 may be configured to enable and/or disable various components in the system 100. For example, the processor 110 may issue time varying commands to the actuator control circuit 120 to generate the drive signal $S_{DR}$.

In some embodiments, the processor 110 may be implemented externally to the image sensor 150. The processor 110 may be further configured to determine the magnitude of the drive signal $S_{DR}$ along with its corresponding drive force $F_{DR}$.

In addition, the processor 110 may be further configured to generate various position instruction values $P_{REF}(x, y, z)$ and may instruct the system 100 to position the lens 142 in the x-, y-, and/or z-axis direction according to the position instruction values $P_{REF(X,Y,Z)}$. The position instruction values $P_{REF(X, Y, Z)}$ may be generated based on the drive signal $S_{DR}$ and may, for example, indicate the target position and/or the current position of the lens 142. Each position instruction value $P_{REF(X,Y, Z)}$ may correspond to one component (x-, y-, and/or z-component) of the current position and/or the target position of the lens 142. The processor 110 may comprise any suitable processing device, such as microprocessors, application processors, microcontrollers, programmable logic devices, or the like.

Figure 2:
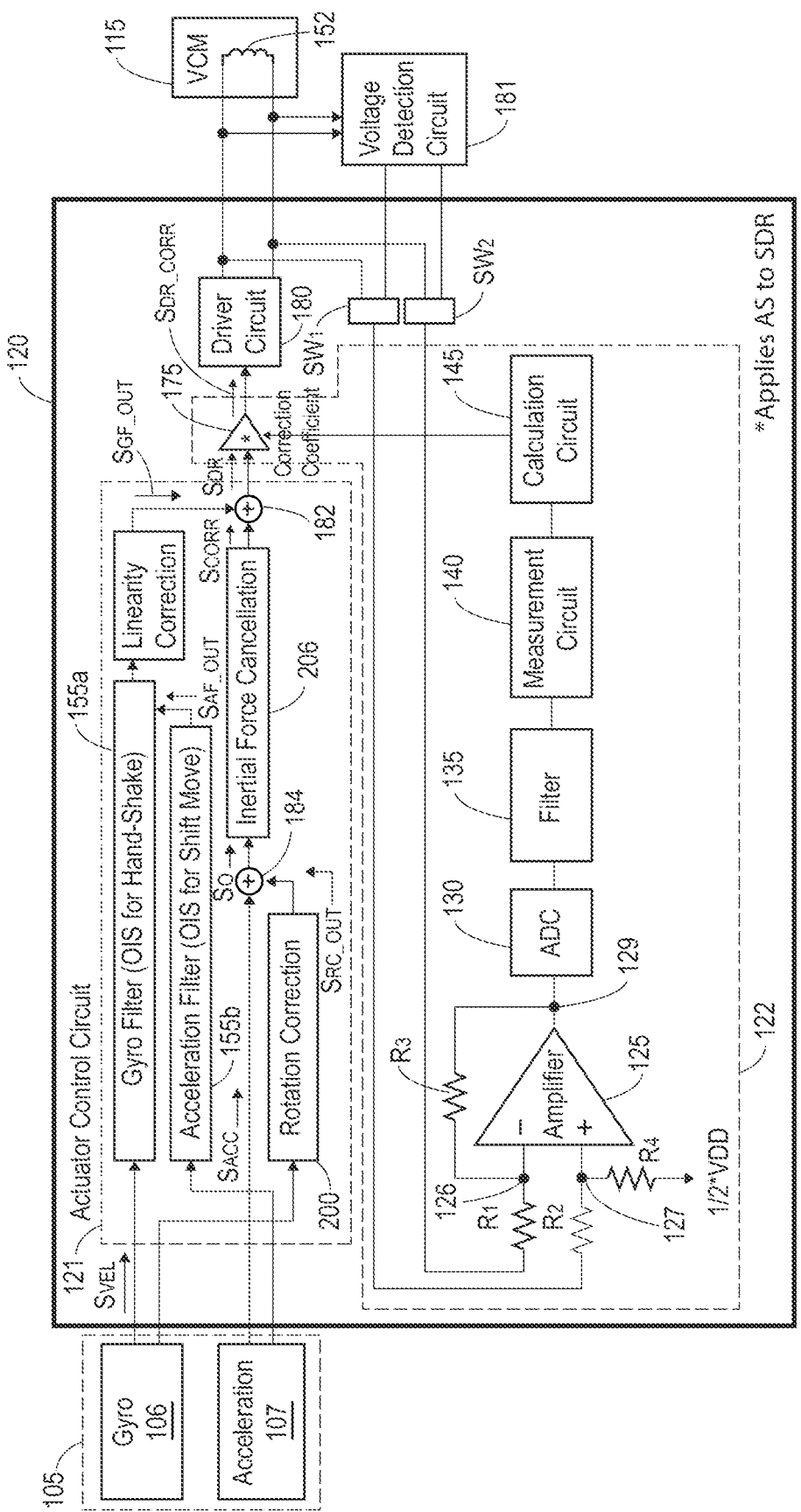
FIG. 2 is a block diagram of an actuator control circuit in accordance with an exemplary embodiment of the present technology.
Figure 3:
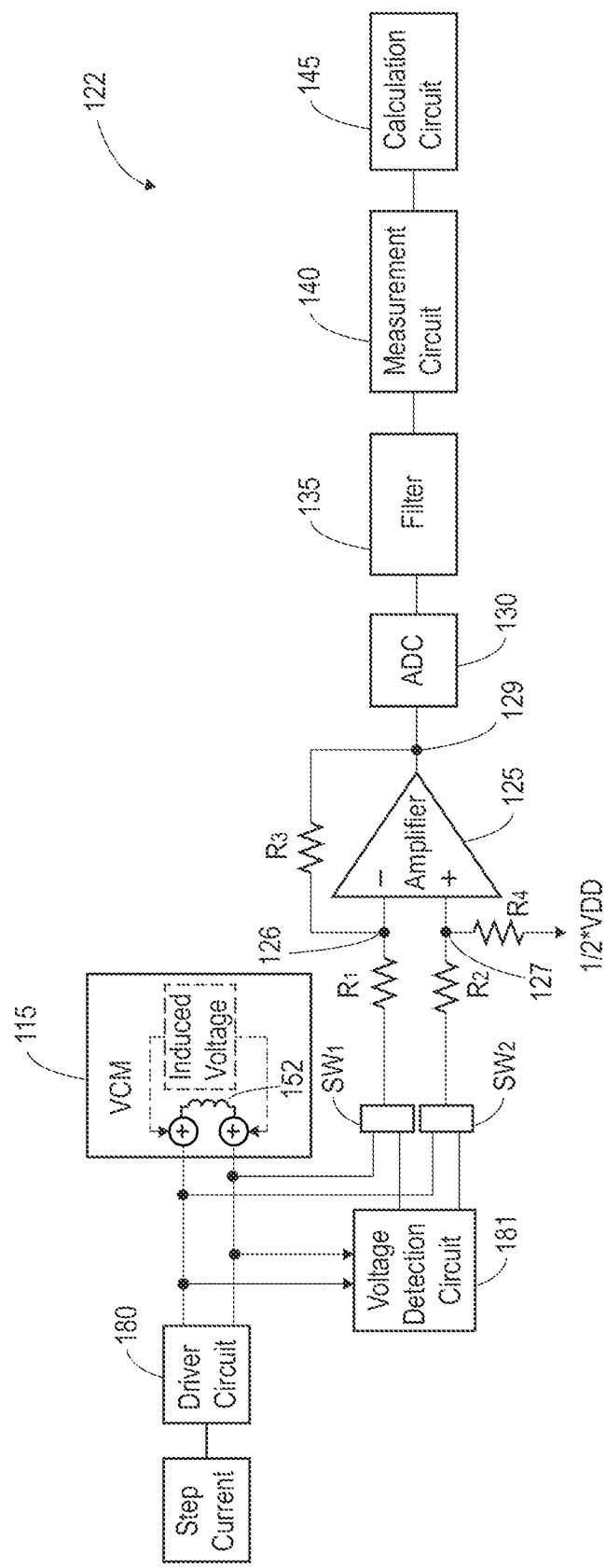
FIG. 3 is a block diagram of a portion of the actuator control circuit in accordance with an exemplary embodiment of the present technology.

In various embodiments, and referring to FIGS. 1-3, the actuator control circuit 120 may be configured to control and supply power to various devices within the system 100. For example, the actuator control circuit 120 may supply power to the actuator 115 via the drive signal $S_{DR}$. The drive signal $S_{DR}$ may control a current or a voltage in the actuator 115, which may control the movement of the actuator 115. Accordingly, the movement of the actuator 115 may be proportional to the magnitude of the drive signal $S_{DR}$. The actuator control circuit 120 may comprise any suitable control device or system capable of providing energy to the actuator 115.

In various embodiments, such as in a closed-loop system, the actuator control circuit 120 may receive and respond to a feedback signal, such as a hall sensor signal from a hall sensor (not shown). The hall sensor may be configured to detect a position of the actuator 115 and/or the lens 142. The actuator control circuit 120 may utilize the feedback signal in conjunction with the acceleration signal $S_{ACC}$ and/or the velocity signal $S_{VEL}$ to determine an appropriate amount of power to supply to the actuator 115 based on a desired lens position, such as the target position.

In various embodiments, the actuator control circuit 120 may be further configured to determine the magnitude of the drive signal $S_{DR}$ along with its corresponding drive force $F_{DR}$. For example, the drive signal $S_{DR}$ may be determined by generating a correction signal $S_{CORR}$ according to a base signal $S_0$, i.e., by amplifying the base signal $S_0$ by one or more coefficients to match the amplitude of the drive signal $S_{DR}$ that is needed to produce the requisite drive force $F_{DR}$ to cancel out the inertial force applied to the lens 142 by gravity and the disturbance signal 128. The base signal $S_0$ may be referred to as a reference signal (i.e., a drive signal without inertial force correction) and may be generated by an addition circuit 184. For example, the addition circuit 184 may generate the base signal $S_0$ according to the acceleration signal $S_{ACC}$ and a rotation correction output signal $S_{RC\_OUT}$ generated by a rotation correction circuit 200. The rotation correction output signal $S_{RC\_OUT}$ may be generated according to the velocity signal $S_{VEL}$.

The drive signal $S_{DR}$, correction signal $S_{CORR}$, base signal $S_0$, and rotation correction output signal $S_{RC\_OUT}$ may comprise any suitable signal, such as a current signal, a voltage signal, and the like. For instance, in the case where the correction signal $S_{CORR}$ is a correction current $I_{CORR}$, the correction current $I_{CORR}$ may be determined according to the magnitude of the inertial force applied to the lens 142 by gravity and the disturbance single 128, where the correction current $I_{CORR}$ may be proportional to the requisite drive force $F_{DR}$ needed to cancel out the inertial force applied to the lens 142.

In one embodiment, and referring to FIG. 6, the actuator control circuit 120, the sensor 105, and the image sensor 150 may be integrated on a single substrate 190. In another embodiment, and referring to FIG. 7, the sensor 105 may be formed on a separate substrate. It will be appreciated that it may be advantageous to integrate the circuit components on a single substrate to reduce substrate surface area and to ensure uniformity among the characteristics of the circuit components. It will also be appreciated that it may be advantageous to integrate residual circuit components, such as resistors and capacitors, on a separate substrate to more easily adjust their parameters. The substrate may be any suitable substrate, such as a printed circuit board (PCB), or the like.

In addition, it will be appreciated that the actuator control circuit 120 may be further configured to determine the various position instruction values $P_{REF(X, Y, Z)}$, and may instruct the system 100 to position the lens 142 in the x-, y-, and/or z-axis directions according to the position instruction values $P_{REF(X, Y, Z)}$.

Figure 4:
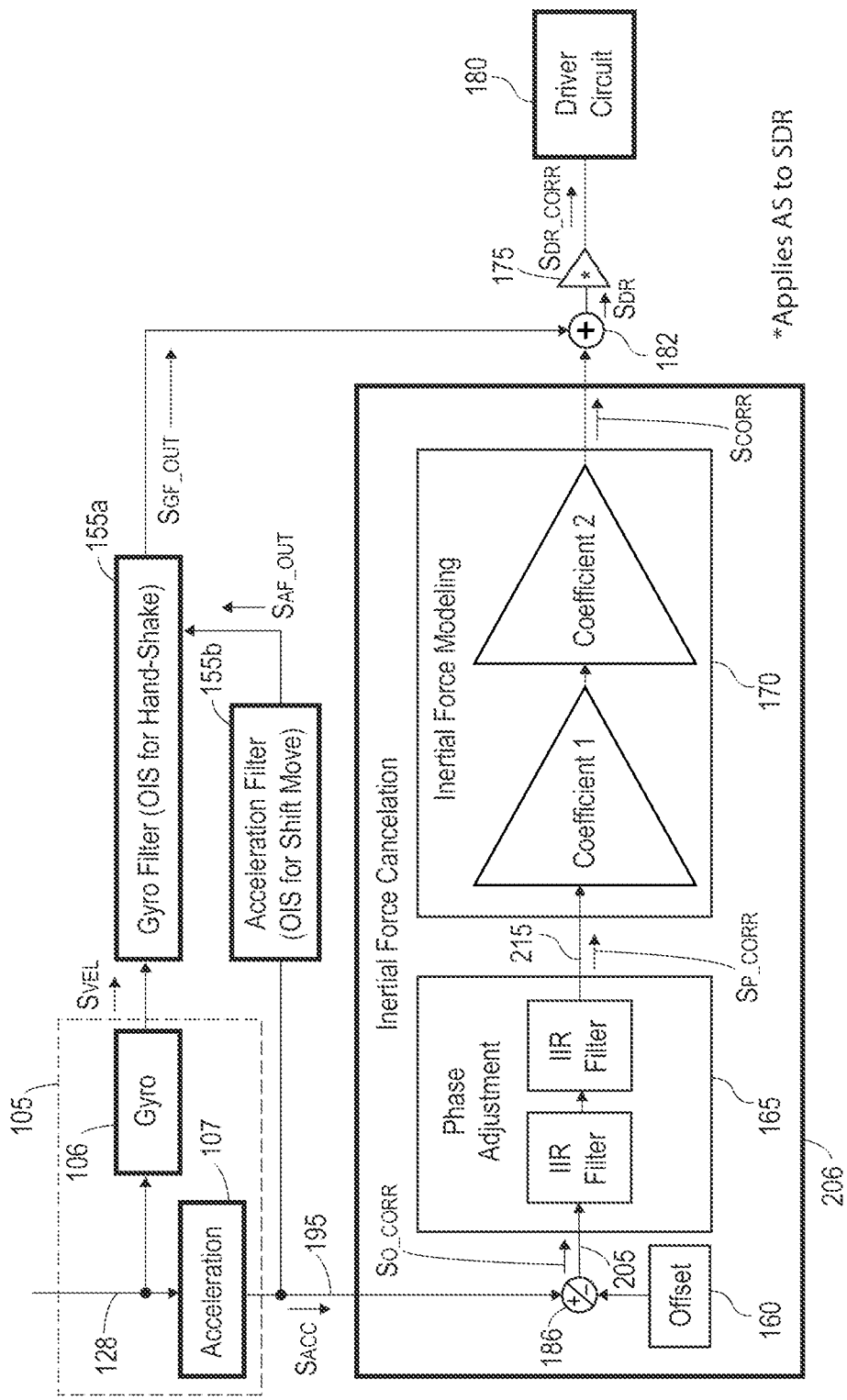
FIG. 4 is a block diagram of a portion of the actuator control circuit in accordance with an exemplary embodiment of the present technology.

According to an exemplary embodiment, and referring now to FIGS. 2-4, the actuator control circuit 120 may comprise a first circuit portion 121 configured to receive the acceleration signal $S_{ACC}$ and/or the velocity signal $S_{VEL}$. The first circuit portion 121 may comprise a gyro filter 155a, an acceleration filter 155b, the rotation correction circuit 200, and an inertial force cancellation circuit 206.

The first circuit portion 121 may be configured to receive the acceleration signal $S_{ACC}$ and/or the velocity signal $S_{VEL}$ and apply a gain to the acceleration signal $S_{ACC}$ and/or the velocity signal $S_{VEL}$ based on the target position of the lens 142 in order to cancel out the inertial force applied to the lens 142 by gravity and the disturbance signal 128.

In one embodiment, the inertial force cancellation circuit 206 may comprise a first sub-circuit (i.e., an offset correction circuit 160), a second sub-circuit (i.e., a phase correction circuit 165), and a third sub-circuit (i.e., an inertial force modeling circuit 170). The offset correction circuit 160, phase correction circuit 165, and inertial force modeling circuit 170 may be in communication with each other.

The offset correction circuit 160 may be configured to generate an offset-corrected signal $S_{O\_CORR}$ according to the acceleration signal $S_{ACC}$. For example, the offset correction circuit 160 may subtract a DC offset error and/or bias from each of the x-, y-, and/or z-components of the acceleration signal $S_{ACC}$, via a calculation circuit 186. Each DC offset and/or bias may comprise a noise signal, which is generally an unwanted addition to its respective component of the acceleration signal $S_{ACC}$. The offset correction circuit 160 may comprise any suitable computation circuit configured to receive each component of the acceleration signal $S_{ACC}$ and remove the DC offset error and/or bias from each component.

The magnitude of each DC offset error and/or bias may depend on the type of sensor 105 used in the system 100 and may be influenced by certain factors, such as the size of the sensor 105 and/or the temperature of the environment in which the sensor 105 is operating in. The magnitude of each DC offset error and/or bias may be predetermined using any suitable calibration method, such as by measuring the amplitude of signals detected by the sensor 105 when the sensor 105 is operating in a reference state (i.e., when the sensor 105 is not being acted upon by the disturbance signal 128). When the sensor 105 is not being acted upon by the disturbance signal 128 during the reference state, signals that are detected are considered to be the noise signals. It will be appreciated that a large number of noise readings may be taken from the sensor 105, such that an average amplitude of the noise signals may be determined to more accurately determine the magnitude of the DC offset errors and/or biases. Accordingly, the offset correction circuit 160 may be configured to generate the offset-corrected signal $S_{O\_CORR}$ by subtracting a signal equal in magnitude to the noise signal from each component of the acceleration signal $S_{ACC}$. The offset correction circuit 160 may be further configured to transmit the offset-corrected signal $S_{O\_CORR}$ to the phase correction circuit 165 for additional processing.

The phase correction circuit 165 may be connected to the offset correction circuit 160. The phase correction circuit 165 may be configured to receive the offset-corrected signal $S_{O\_CORR}$ from the offset correction circuit 160 via a signal line or any suitable communication line. The phase correction circuit 165 may be configured to correct or otherwise adjust a phase offset error present in the offset-corrected signal $S_{O\_CORR}$ received from the offset correction circuit 160. For example, the phase correction circuit 165 may generate a phase-corrected signal $S_{P\_CORR}$ that is shifted in phase with respect to the offset-corrected signal $S_{O\_CORR}$ supplied to it from the offset correction circuit 160.

Figure 5:
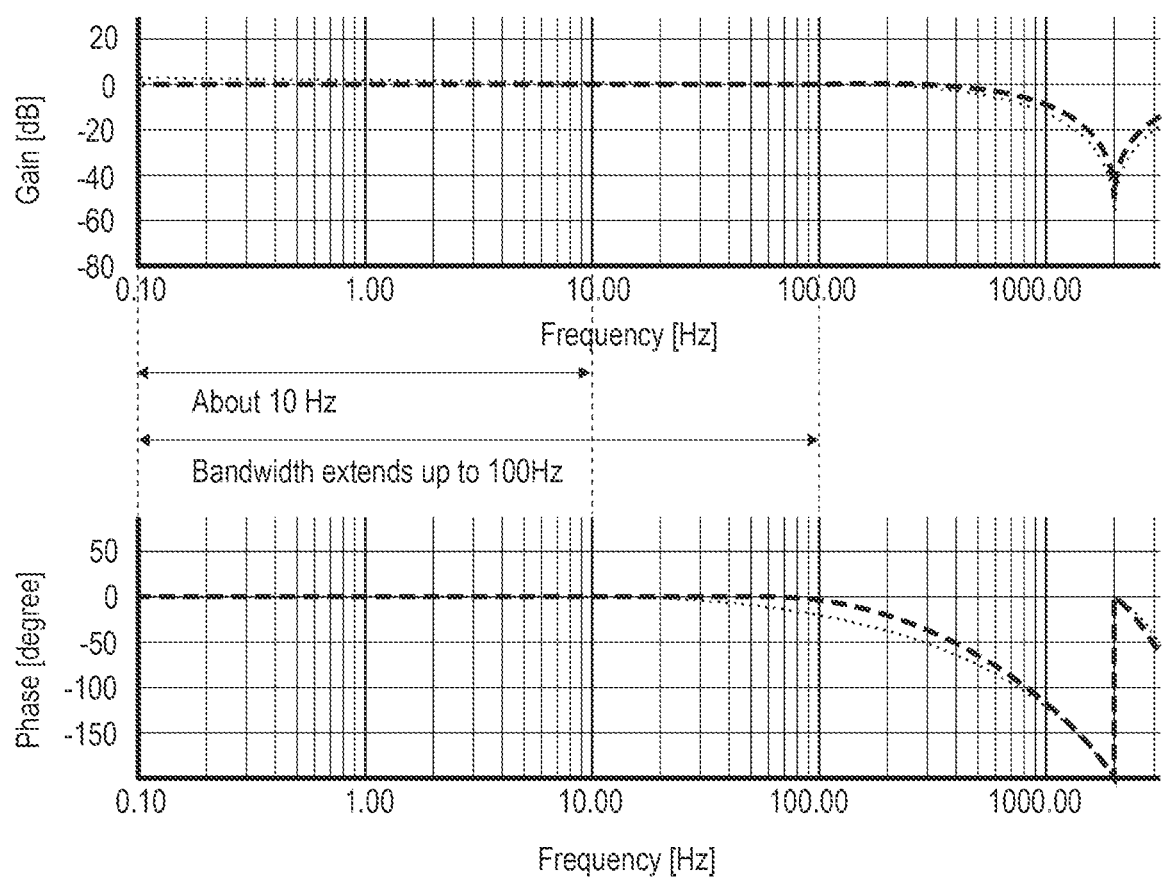
FIG. 5 is a graph illustrating a difference in phase angle between a disturbance signal applied to the optical image stabilization system and a resulting acceleration signal applied to a portion of the optical image stabilization system.

The phase offset error may be a difference in phase angle between the disturbance signal 128 applied to the system 100 and the resulting signal applied to the lens 142 for any given frequency at which the disturbance signal 128 operates. The phase offset error may be caused by at least one of a misalignment of the actuator control circuit 120, a time constant of the sensor 105, a frequency of the disturbance signal 128 that is beyond the maximum allowed bandwidth of the sensor 105, a communication delay between the sensor 105 and the actuator control circuit 120, and the like. For example, and referring to FIG. 5, when the disturbance signal 128 is operating at a frequency of 100 Hz and is applied to the system 100, there may be a sizeable phase offset error (e.g., in or around 20 degrees) between the disturbance signal 128 applied to the system 100 and the resulting signal applied to the lens 142. Because the signal causes a force to be applied to the lens 142, the phase offset error may cause the lens 142 to vibrate uncontrollably.

The phase correction circuit 165 may comprise one or more suitable filters capable of substantially removing the phase offset error present in the offset-corrected signal $S_{O\_CORR}$, such as a low-boost filter, a high-boost filter, or the like. For instance, an infinite impulse response (IIR) system, comprising one or more IIR filters, may be used to attenuate various frequencies in the offset-corrected signal $S_{O\_CORR}$. For example, the IIR system may be configured to receive the x-, y-, and/or z-components of the acceleration signal $S_{ACC}$. Each IIR filter may be used to filter one component of the acceleration signal $S_{ACC}$. The phase correction circuit 165 may be further configured to transmit the phase-corrected signal $S_{P\_CORR}$ to the inertial force modeling circuit 170 for further processing.

The inertial force modeling circuit 170 may be configured to receive the phase-corrected signal $S_{P\_CORR}$ from the phase correction circuit 165 and compensate for the effect that gravity and the disturbance signal 128 has on various components in the system 100, such as the lens 142. For example, given a particular position instruction value (code) associated with a respective target position, the actual lens position may not be equal to the target position. The position instruction value (code) may correspond to a particular current value applied to the actuator 115, so when a particular lens position is desired, the actual amount of current required by the actuator 115 may be different than the one specified by the position instruction value (code).

The inertial force modeling circuit 170 may be configured to perform various functions, such as amplification, signal conversion, analysis and the like, to perform an inertial force correction scheme. The inertial force correction circuit 170 may comprise any suitable signal gain controller capable of amplifying the phase-corrected signal $S_{P\_CORR}$ received from the phase correction circuit 165, such as an attenuator, amplifier, or the like. The inertial force modeling circuit 170 may amplify the phase-corrected signal $S_{P\_CORR}$ by one or more predetermined coefficients to match the amplitude of the drive signal $S_{DR}$ that is needed to produce the requisite drive force $F_{DR}$ to move the lens 142 to the target position. The inertial force modeling circuit 170 may be further configured to transmit the amplified phase-corrected signal, in the form of the correction signal $S_{CORR}$, to another portion and/or sub-circuit of the actuator control circuit 120 for further processing. For example, the inertial force modeling circuit 170 may transmit the correction signal $S_{CORR}$ to an addition circuit 182 for further processing.

In various embodiments, and referring to FIG. 2, the gyro filter 155*a* and the acceleration filter 155*b* may perform various functions on a signal (e.g., the velocity signal $S_{VEL}$ and the acceleration signal $S_{ACC}$), respectively, such as integration and frequency characteristic adjustment (i.e., DC cutting). For example, the gyro and acceleration filters 155*a*, 155*b* may integrate an angular velocity of the velocity signal $S_{VEL}$ and an angular acceleration of the acceleration signal $S_{ACC}$, respectively, and prevent transmission of the signals at undesired frequencies. The gyro and acceleration filters 155*a*, 155*b* may be connected between the sensor 105 and a stroke sensitivity correction gain application (SSCGA) circuit 175 via a linearity correction circuit. The linearity correction circuit may apply a gain to an output signal of the gyro filter 155*a*. In various embodiments, the gyro and acceleration filters 155*a*, 155*b* may each comprise an interface (I/F) circuit (not shown) and an integrator circuit (not shown). The gyro and acceleration filters 155*a*, 155*b* may operate in conjunction with each other to calculate the target position of the lens 142.

In various embodiments, the gyro filter 155*a* may be configured to utilize the x-, y-, and/or z-components of the velocity signal $S_{VEL}$ to generate a gyro filter output signal $S_{GF\_OUT}$. The gyro filter output signal $S_{GF\_OUT}$ may control a current or a voltage in the actuator 115, which controls the movement of the actuator 115. Accordingly, the movement of the actuator 115 (or a portion of the actuator 115) may be proportional to the magnitude of the gyro filter output signal $S_{GF\_OUT}$. The gyro filter output signal $S_{GF\_OUT}$ may comprise any suitable drive signal, such as current signals, voltage signals, and the like. The gyro filter 155*a* may be further configured to transmit the gyro filter output signal $S_{GF\_OUT}$ to another portion and/or sub-circuit of the actuator control circuit 120 for further processing. For example, the gyro filter 155*a* may transmit the gyro filter output signal $S_{GF\_OUT}$ to the addition circuit 182 where it may be added to the correction signal $S_{CORR}$ before being transmitted, in the form of the drive signal $S_{DR}$, to the SSCGA circuit 175.

In various embodiments, the gyro filter 155*a* may convert various angular velocity components to respective shake angles. Each angular velocity component may be associated with one of the components of the velocity signal $S_{VEL}$ and each shake angle may be associated with one angular velocity component. The gyro filter 155*a* may determine a reference target position of the lens 142 in each direction according to the respective shake angle. For example, in the case of the y-axis, the gyro filter 155*a* may compute an integration of the angular velocity around the x-axis to generate its respective shake angle. The gyro filter 155*a* may then determine the reference target position of the lens 142 in the y-axis direction according to the calculated shake angle. The gyro filter 155*a* may transmit the reference target position, in the form of the gyro filter output signal $S_{GF\_OUT}$, to another portion of the actuator control circuit 120, such as the addition circuit 182 for additional processing.

In various embodiments, the acceleration filter 155*b* may be configured to utilize the various components of the acceleration signal $S_{ACC}$ to generate an acceleration filter output signal $S_{AF\_OUT}$. The acceleration filter output signal $S_{AF\_OUT}$ may control a current or a voltage in the actuator 115, which may control the movement of the actuator 115. Accordingly, the movement of the actuator 115 (or a portion of the actuator 115) may be proportional to the magnitude of the acceleration filter output signal $S_{AF\_OUT}$. The acceleration filter output signal $S_{AF\_OUT}$ may comprise any suitable drive signal, such as current signals, voltage signals, and the like. The acceleration filter 155b may be further configured to transmit the acceleration filter output signal $S_{AF\_OUT}$ to another portion and/or sub-circuit of the actuator control circuit 120 for further processing. For example, the acceleration filter 155b may transmit the acceleration filter output signal $S_{AF\_OUT}$ to the gyro filter 155a where it may be added to the gyro filter output signal $S_{GF\_OUT}$ before being transmitted to the addition circuit 182 for additional processing.

In various embodiments, the acceleration filter 155b may perform a double-integration of the acceleration signal $S_{ACC}$ to generate a respective position signal of the lens 142. The position signal may be used to compute a deviation from the reference target position. The acceleration filter 155b may transmit the computed deviation, in the form of the acceleration filter output signal $S_{AF\_OUT}$, to another portion of the actuator control circuit 120, such as the gyro filter 155a, where the computed deviation may be added to the reference target position to determine the target position to be set for the lens 142 in the y-axis direction. Each target position may be relative to a reference point on the x-y-z reference coordinate system and gravity.

Referring now to FIGS. 2-4, the actuator control circuit 120 may be further configured to generate the drive signal $S_{DR}$ according to the gyro filter output signal $S_{GF\_OUT}$ and the correction signal $S_{CORR}$. For example, the addition circuit 182 may add the gyro filter output signal $S_{GF\_OUT}$ and the correction signal $S_{CORR}$ to each other.

In addition, the actuator control circuit 120 may be further configured to apply a stroke sensitivity correction gain $A_S$ (i.e., a correction coefficient) to the drive signal $S_{DR}$, via the SSCGA circuit 175, and transform the drive signal $S_{DR}$ into a corrected drive signal $S_{DR\_CORR}$. For example, the actuator control circuit 120 may comprise a second circuit portion 122 configured to receive the drive signal $S_{DR}$ from the first circuit portion 121 (e.g., the addition circuit 182) and may comprise an amplifier 125, an analog-to-digital converter (ADC) 130, a filter 135, a fourth sub-circuit (i.e., a measurement circuit 140), a fifth sub-circuit (i.e., a calculation circuit 145), and the SSCGA circuit 175.

The second circuit portion 122 may be configured to receive the drive signal $S_{DR}$ from the first circuit portion 121 (e.g., the addition circuit 182) and perform a stroke sensitivity correction scheme. For example, the second circuit portion 122 may compensate for the effect that a changing stroke sensitivity S has on various components in the system 100, such as the lens 142. The stroke sensitivity S may be defined by how much the lens 142 displaces per unit of current. In an ideal system, the stroke sensitivity S may be a constant value. However, in practice, the stroke sensitivity S may change due to deterioration (i.e., aging) in the electronic device and/or impacts due to accidentally dropping the electronic device.

For example, and referring now to FIG. 8, as the electronic device ages or experiences wear and tear, the distance between the magnet 185 and the coil 152 may change (i.e., increase or decrease). As the distance between the magnet 185 and the coil 152 increases, the stroke sensitivity S may decrease. In contrast, as the distance between the magnet 185 and the coil 152 decreases, the stroke sensitivity S may increase. Given that each position instruction value (code) corresponds to a particular current value applied to the actuator 115, when a particular lens position is desired, the actual amount of current required by the actuator 115 to move the lens 142 to the target position may be different than the current value specified by the position instruction value (code). Consequently, a decreasing stroke sensitivity S may cause an under correction of the lens position, while an increasing stroke sensitivity S may cause an over correction of the lens position.

To compensate the system 100 for a varying stroke sensitivity S, the actuator control circuit 120 may, for example, comprise a driver circuit 180. The driver circuit 180 may be configured to apply a step current to the actuator 115 over a first time period. The step current applied to the actuator 115 may be an analog signal and may decrease from a predetermined current value to zero over the first time period. When a constant current is applied to the actuator 115, the magnet 185 may generate a magnetic flux density B. Accordingly, when a varying current (i.e., the step current) is applied to the magnet 185, the magnetic flux density B may vary (i.e., change over time). As a result, the coil 152 and the magnet 152 may induce (i.e., generate) a varying voltage. The induced voltage may be used by the actuator 115, which may be configured as a voice coil motor (VCM), to generate a thrust force to position a moving body, such as the lens 142.

Figure 14:
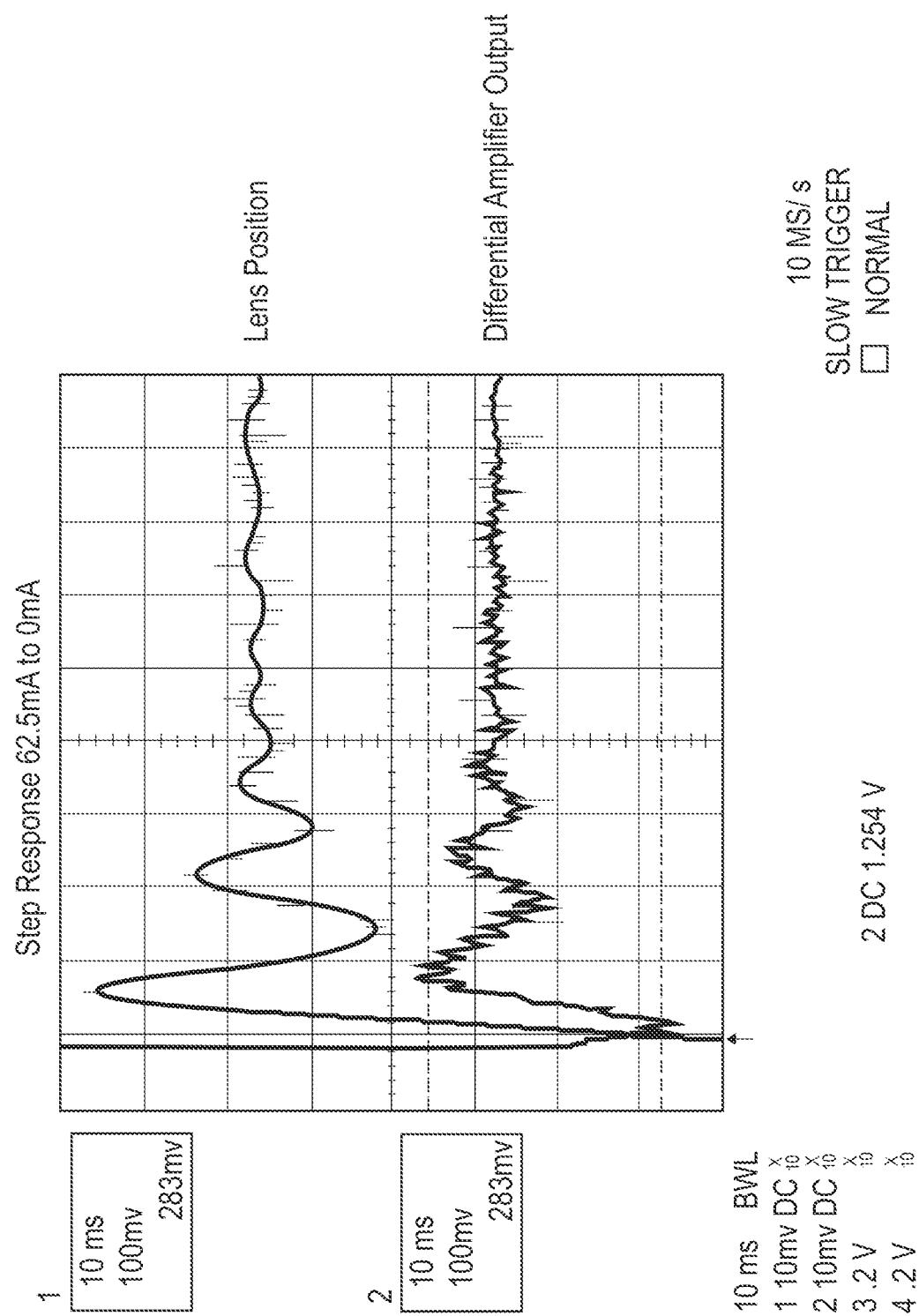
FIG. 14 is a step response of the system in accordance with an exemplary embodiment of the present technology.

Because the step current decreases from the predetermined current value to zero, the resulting voltage induced in the actuator 115 may also decrease. Consequently, and referring now to FIGS. 11-14, as the voltage signal decreases over time, so does the thrust force generated by the actuator 115. When the stroke sensitivity S is at its highest value (i.e., when a movement of the lens 142 is most sensitive to the induced voltage), the induced voltage of the actuator 115 may be at its highest value. In contrast, when the stroke sensitivity S is at its lowest value (i.e., when a movement of the lens 142 is least sensitive to the induced voltage), the induced voltage of the actuator 115 may be at its lowest value. Embodiments of the present technology provide a step response where the displacement of the lens 142 coincides with the output voltage generated by the actuator control circuit 120, where the displacement is a result of a change in the target position (e.g., as illustrated in FIG. 14).

The actuator control circuit 120 may further comprise a voltage detection circuit 181 connected to the driver circuit 180 and the actuator 115 and may be configured to detect the induced voltage of the actuator 115. The voltage detection circuit 181 may be further configured to transmit an analog voltage signal to the second circuit portion 122 according to the induced voltage.

Referring again to FIGS. 2 and 3, it will be appreciated that the induced voltage of the actuator 115 may be detected and/or received by the amplifier 125 in any suitable way. For example, in one embodiment, the actuator control circuit 120 may further comprise a first switch $SW_1$ and a second switch $SW_2$. The first switch $SW_1$ may be configured to selectively connect a first input terminal 126 of the amplifier 125 to the actuator 115. In addition, the first switch $SW_1$ may be further configured to selectively connect the first input terminal 126 of the amplifier 125 to the voltage detection circuit 181. Similarly, the second switch $SW_2$ may be configured to selectively connect a second input terminal 127 of the amplifier 125 to the actuator 115. In addition, the second switch $SW_2$ may be further configured to selectively connect the second input terminal 127 of the amplifier 125 to the voltage detection circuit 181. The first switch $SW_1$ and the second switch $SW_2$ may operate in conjunction with each other to selectively connect the amplifier 125 to the actuator 115 and/or the voltage detection circuit 181.

In various embodiments, the amplifier 125 may be connected to the actuator 115 and configured to receive an input signal, such as the analog voltage signal, and amplify the input signal. The amplifier 125 may be a differential amplifier and may comprise the first input terminal 126, the second input terminal 127, and an output terminal 129. The first input terminal 126 may be connected to a first end of the coil 152 via a first resistor R1. The second input terminal 127 may be connected to a second end of the coil 152 via a second resistor R2. The second input terminal 127 may be further connected to a voltage source (e.g., ½*VDD), via a fourth resistor R4. The output terminal 129 may be connected to the first input terminal 126 via a feedback loop comprising a third resistor R3. Accordingly, the magnitude of amplification applied to the analog voltage signal may be determined according to the values of R1, R2, R3, and R4. The amplifier 125 may comprise an amplifier circuit or any other circuit and/or system suitable for receiving an input signal and amplifying the input signal.

The ADC 130 may be connected to the amplifier 125 and configured to receive the amplified analog voltage signal from the amplifier 125. The ADC 130 may be further configured to convert the amplified analog voltage signal to a corresponding digital voltage signal. The ADC 130 may be further connected to the filter 135, wherein the ADC 130 may transmit the digital voltage signal to the filter 135 for further processing. The ADC 130 may comprise any circuit and/or ADC architecture suitable for converting an analog signal into a digital signal.

The filter 135 may be configured to generate a filtered digital voltage signal in response to receiving the digital voltage signal from the ADC 130. The filter 135 may attenuate a portion of the digital voltage signal in a first range of frequencies, pass a portion of the digital voltage signal in a second range of frequencies, and attenuate a portion of the digital voltage signal in a third range of frequencies. For example, the first range of frequencies may comprise DC-frequencies and/or near-DC frequencies, the second range of frequencies may comprise a first resonance frequency, and the third range of frequencies may comprise a second resonance frequency. The filtered digital voltage signal may comprise a plurality of peaks. The filter may comprise any suitable filter and/or filter system, such as a band-pass filter, and the like. In various embodiments, the digital filter 135 may comprise a band-pass filter, which removes predetermined high and low frequencies and allows intermediate frequencies (those frequencies between the high and low frequencies) to pass through.

The measurement circuit 140 may be connected to the filter 135 and configured to measure a difference value between a first peak and a second peak, where each peak may represent a corresponding voltage level of an output signal of the filter 135. The second peak may follow the first peak, and the second peak may be of opposite sign with respect to the first peak.

In an exemplary embodiment, the measured difference value may be the largest difference value. As an example, and referring now to FIGS. 11-14, when the system 100 is calibrating the drive signal $S_{DR}$ during the reference state, the actuator control circuit 120 may apply a decreasing analog current signal to the coil 152, wherein the analog current signal decreases from a predetermined current value to zero. The resulting voltage induced in the coil 152 (i.e., the resulting analog voltage signal) may comprise successively decreasing peak amplitudes. Accordingly, the filtered digital voltage signal may also comprise successively decreasing peak amplitudes, and the measured difference value between adjacent peaks may vary. It will be appreciated that it may be advantageous to use the largest measured difference value to compute and produce an optimal stroke sensitivity correction gain $A_S$. In various embodiments, the measurement circuit 140 may comprise any circuit and/or system suitable for performing difference calculations, and the like. For example, the measurement circuit 140 may comprise a system of logic circuits or a field programmable gate array circuit.

Referring again to FIGS. 1-3, in various embodiments, the system 100 may further comprise a memory (not shown) configured to store the predetermined current value. The memory may comprise a flash memory or any other suitable memory type. In addition, the memory may be integrated within the actuator control circuit 120, or alternatively, may be formed on a companion circuit that is accessible to the actuator control circuit 120.

The calculation circuit 145 may be connected to the measurement circuit 140 and configured to produce the stroke sensitivity correction gain $A_S$ according to the measured difference value and a predetermined difference value. The predetermined difference value may be a threshold difference value (i.e., a measured difference value upon first time use) and may be provided by a manufacturer. The threshold difference value may be determined according to various parameters, such as the length L of the coil 152, the mass m of the lens 142, and the magnetic flux density B associated with the coil 152. Accordingly, the threshold value may change across different modules depending on the values of m, B, and L.

The calculation circuit 145 may be further configured to compute the stroke sensitivity correction gain $A_S$ according to the measured difference value $D_M$ and the predetermined difference value $D_P$. In an exemplary embodiment, the stroke sensitivity correction gain $A_S$ is described by the following equation:

$$A_S = \sqrt{D_P/D_M}$$

The calculation circuit 145 may be in communication with the SSCGA circuit 175. For example, the calculation circuit 145 may provide the stroke sensitivity correction gain $A_S$ to the SSCGA circuit 175. In various embodiments, the calculation circuit 145 may comprise any circuit and/or system suitable for performing various calculations, such as division, multiplication, square root, and the like. For example, the calculation circuit 145 may comprise a system of logic circuits or a field programmable gate array circuit.

The SSCGA circuit 175 may be configured to receive an input signal, such as the drive signal $S_{DR}$, and apply the stroke sensitivity correction gain $A_S$ to the input signal. For example, the SSCGA circuit 175 may be connected to the calculation circuit 145 and may receive the stroke sensitivity correction gain $A_S$ from the calculation circuit 145. Accordingly, the SSCGA circuit 175 may apply the computed stroke sensitivity correction gain $A_S$ received from the calculation circuit 145 to the drive signal $S_{DR}$. After the stroke sensitivity correction gain $A_S$ has been applied to the drive signal $S_{DR}$, the resulting corrected drive signal $S_{DR\_CORR}$ may be sent to the driver circuit 180, which may, in turn, provide the corrected drive signal $S_{DR\_CORR}$ to the actuator 115. The SSCGA circuit 175 may comprise an amplifier circuit or any other circuit and/or system suitable for receiving an input signal and applying a gain to the input signal.

It will be appreciated that the stroke sensitivity correction gain $A_S$ may be applied individually to each of the gyro filter output signal $S_{GF\_OUT}$, acceleration filter output signal $S_{AF\_OUT}$, and correction signal $S_{CORR}$.

In various embodiments, the rotation correction circuit 200 may be configured to receive the velocity signal $S_{VEL}$ from the sensor 105. The rotation correction circuit 200 may be further configured to correct for a mismatch between the magnitude of the acceleration that is applied to the sensor 105 by the disturbance signal 128 and the acceleration that is ultimately applied to the actuator 115. For example, if the sensor 105 is displaced due to voluntary and/or involuntary movement, such as a rotation, the magnitude of the acceleration applied to the sensor 105 may be different than the acceleration applied to the actuator 115. In various embodiments, the rotation circuit 200 may comprise any circuit and/or system suitable for performing various transformations and calculations, such as division, multiplication, and the like. For example, the rotation circuit 200 may comprise a system of logic circuits or a field programmable gate array circuit.

In operation, generating the corrected drive signal $S_{DR\_CORR}$ may comprise receiving an input signal, such as the velocity signal $S_{VEL}$ and the acceleration signal $S_{ACC}$, from the gyro sensor 106 and the acceleration sensor 107, respectively. Generating the corrected drive signal $S_{DR\_CORR}$ may further comprise generating the drive signal $S_{DR}$ according to the velocity signal $S_{VEL}$, the acceleration signal $S_{ACC}$, and the base signal $S_0$, via the inertial force cancellation circuit 206, to compensate for the effect that gravity and the disturbance signal 128 have on various components in the system 100, such as the lens 142. Generating the corrected drive signal $S_{DR\_CORR}$ may further comprise calibrating the drive signal $S_{DR}$ by applying a step current to the actuator 115, sampling the voltage induced in the actuator 115, and determining the stroke sensitivity correction gain $A_S$ according to the induced voltage. Generating the corrected drive signal $S_{DR\_CORR}$ may further comprise applying the stroke sensitivity correction gain $A_S$ to the drive signal $S_{DR}$.

Referring now to FIGS. 1-14, at the system start (1000), the system 100 may start generating the corrected drive signal $S_{DR\_CORR}$ in the reference state, i.e., the state prior to the system 100 receiving the disturbance signal 128. In the reference state, the system 100 may perform one or more calibrations to determine the DC offset error and/or bias associated with the sensor 105. In addition, the system 100 may calibrate the drive signal $S_{DR}$ by determining the stroke sensitivity correction gain $A_S$.

Figure 10:
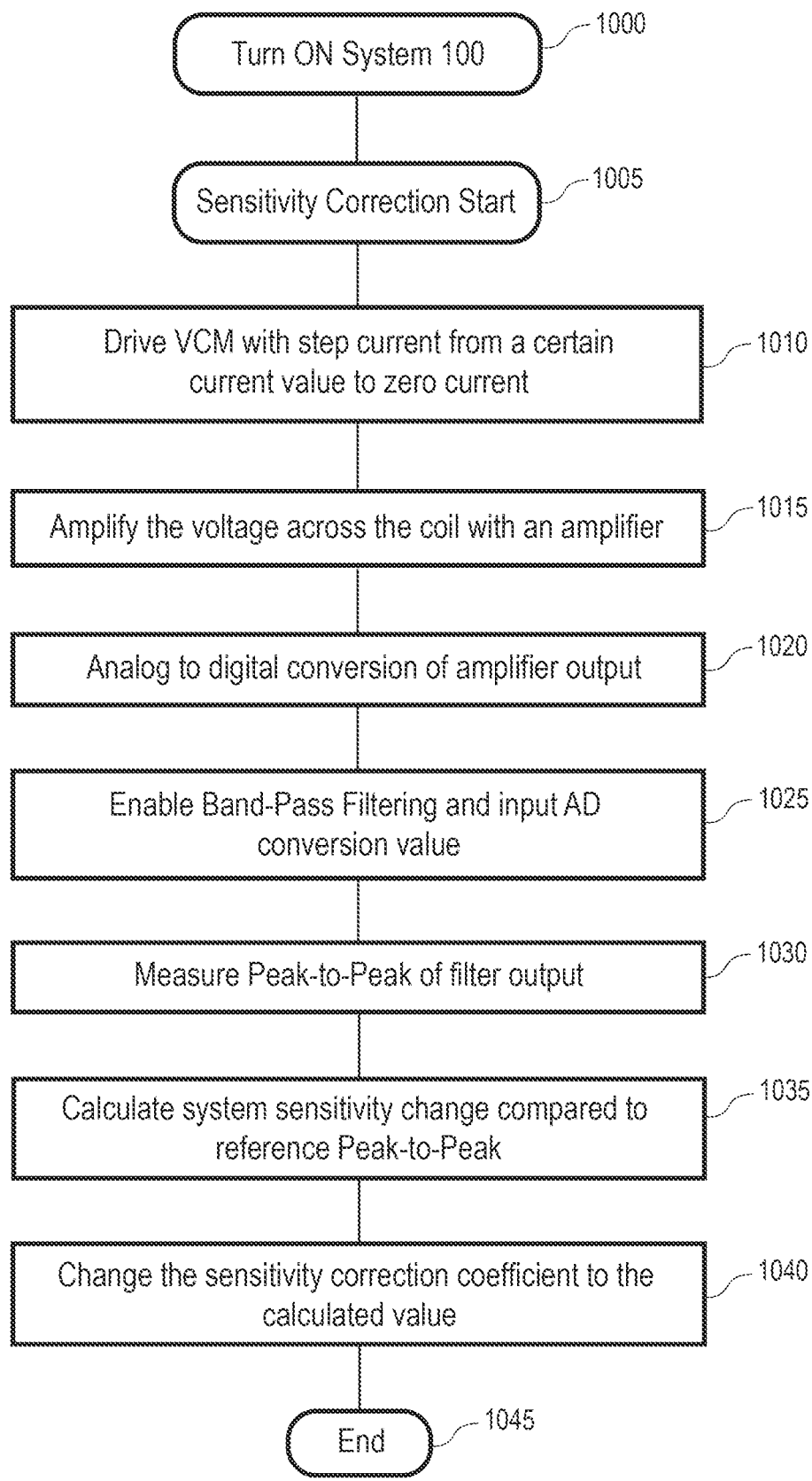
FIG. 10 representatively illustrates a flow diagram for operating a second circuit portion of the optical image stabilization system in accordance with an exemplary embodiment of the present technology.
Figure 11:
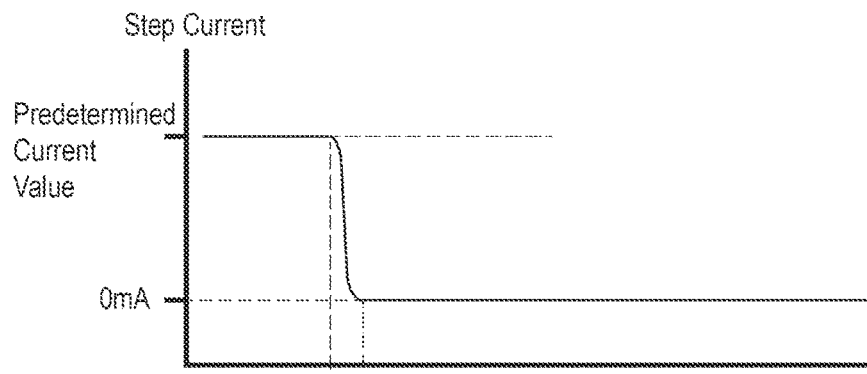
FIG. 11 is a current waveform generated by the actuator control circuit in accordance with an exemplary embodiment of the present technology.
Figure 12:
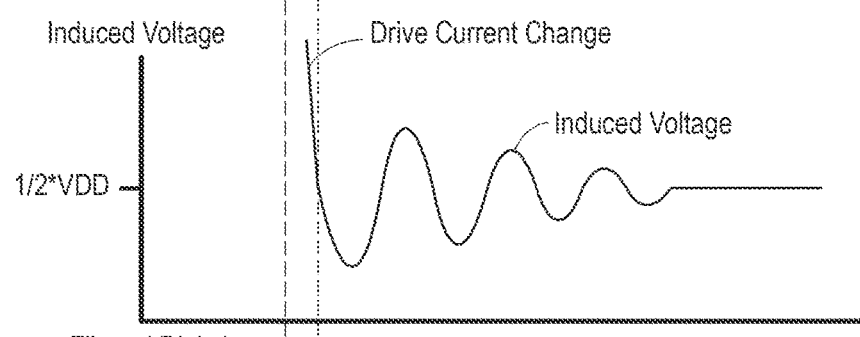
FIG. 12 is an intermediate voltage waveform generated by the actuator control circuit in accordance with an exemplary embodiment of the present technology.
Figure 13:
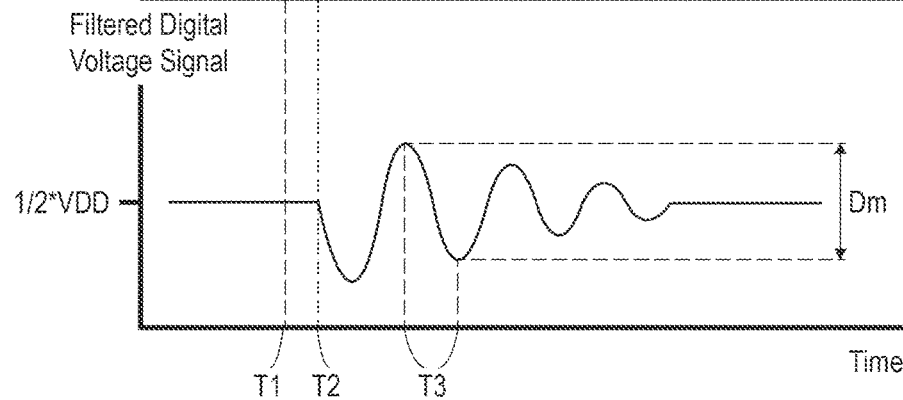
FIG. 13 is an output voltage waveform generated by the actuator control circuit in accordance with an exemplary embodiment of the present technology.

According to an exemplary embodiment, and referring now to FIG. 10, upon turning on the actuator control circuit 120 (i.e., in the reference state) (1005), the system 100 may start calibrating the drive signal $S_{DR}$ by determining the stroke sensitivity correction gain $A_S$. Thereafter, calibrating the drive signal $S_{DR}$ may comprise applying a step current to the coil 152, via the actuator control circuit 120, over a first time period (1010). The step current may be an analog current signal and may decrease from a predetermined current value to zero over the first time period. In response to receiving the step current from the actuator control circuit 120, the coil 152 may induce (i.e., generate) a voltage. The induced voltage may then be sampled via the voltage detection circuit 181 and then transmitted, in the form of an analog voltage signal, to the second circuit portion 122. Thereafter, calibrating the drive signal $S_{DR}$ may further comprise amplifying, via the amplifier 125, the analog voltage signal (1015), and converting, via the ADC 130, the amplified analog voltage signal to a corresponding digital voltage signal (1020). Thereafter, calibrating the drive signal may further comprise generating, via the filter 135, the filtered digital voltage signal from the digital voltage signal (1025). The filtered digital voltage signal may be generated over a second time period, where the second time period may immediately follow the first time period. The measurement circuit 140 may then measure the distance between the first peak and the second peak (1030).

It will be appreciated that any two peaks may be selected. It will also be appreciated that it may be preferable to select the first peak and the second peak such that the difference value between each peak is the largest difference value. In general, once the actuator control circuit 120 applies the analog current signal (i.e., the step current) to the actuator 115, the actuator 115 (and the lens 142) may oscillate for a period of time before settling into the desired position. This period of time may be referred to as the settling time. Accordingly, the actuator control circuit 120 may utilize feedback control systems and/or signals to determine the first peak and the second peak. The second peak may follow the first peak. In addition, the second peak may be of opposite sign with respect to the first peak.

At this time, the actuator control circuit 120 may access the predetermined difference value from the memory (not shown). Thereafter, the calculation circuit 145 may compute the stroke sensitivity correction gain $A_S$ according to the measured difference value $D_M$ and the predetermined difference value $D_P$ (1035). In an exemplary embodiment, the stroke sensitivity correction gain $A_S$ is described by the following equation:

$$A_S = \sqrt{D_P/D_M}$$

The system 100 may store the stroke sensitivity correction gain $A_S$ in the memory (not shown) and/or transmit it to the SSCGA circuit 175 (1040). Thereafter, the system 100 has completed the calibration of the drive signal $S_{DR}$ (1045).

In various embodiments, after the system 100 has completed the initial calibration (as described above with reference to FIG. 10) the system 100 may then begin the inertial force cancellation process (900).

Figure 9:
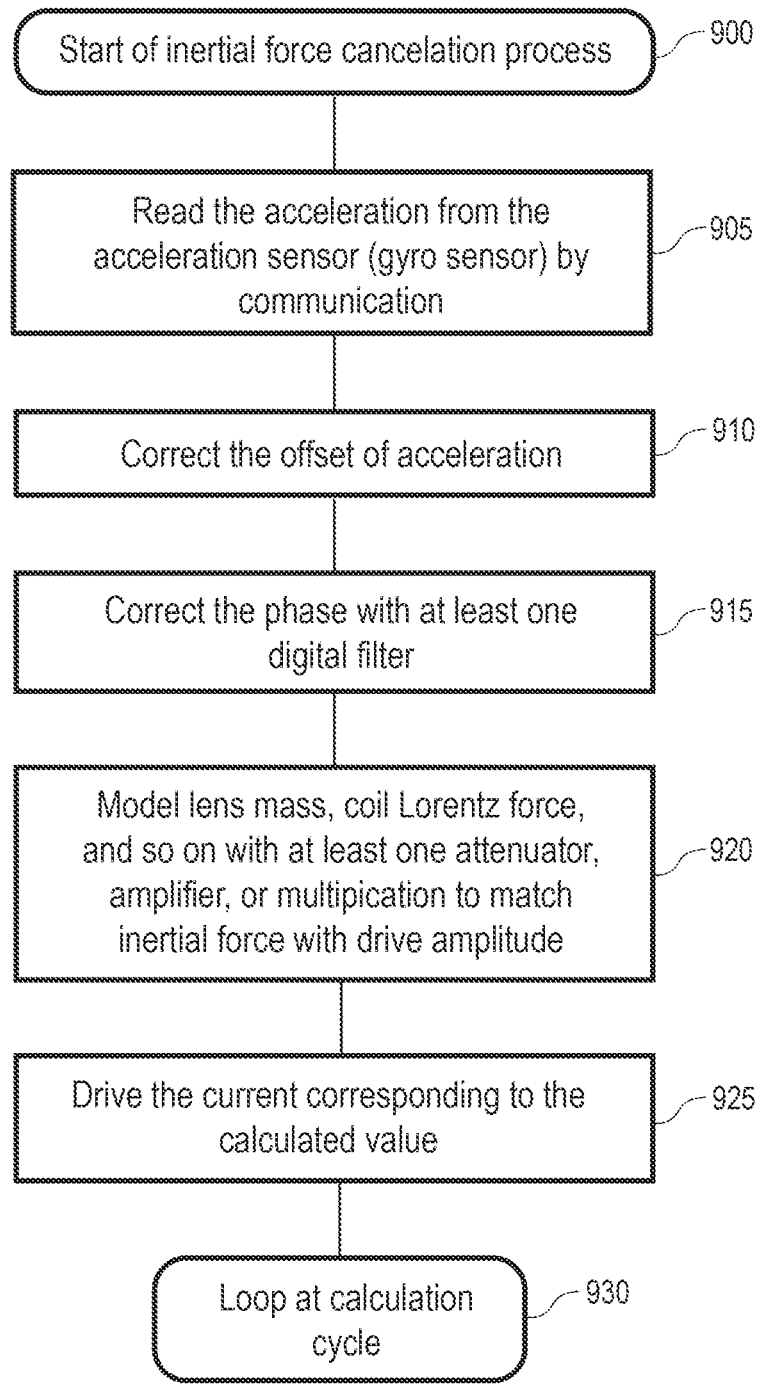
FIG. 9 representatively illustrates a flow diagram for operating a first circuit portion of the optical image stabilization system in accordance with an exemplary embodiment of the present technology.

Referring to FIG. 9, during normal operation, the disturbance signal 128 may be applied to the system 100 in an x-, y-, and/or z-axis direction (905). The disturbance signal 128 may cause the lens 142 to displace (i.e., move) in the x-, y-, and/or z-axis direction. The disturbance signal 128 applied to the system 100 may be expressed mathematically by the following formula:

$$D(t) = A \sin 2\pi ft$$

where D(t) is the displacement at time t, A is the amplitude of the displacement, and f is an arbitrary frequency of the disturbance signal 128.

The sensor 105 may detect the disturbance signal 128 and generate the acceleration signal $S_{ACC}$ and the velocity signal $S_{VEL}$ based on the detected disturbance signal 128. The acceleration sensor 107 may then transmit the acceleration signal $S_{ACC}$ to the actuator control circuit 120 for processing. In response to receiving the acceleration signal $S_{ACC}$ from the acceleration sensor 107, the actuator control circuit 120 may transmit the acceleration signal $S_{ACC}$ to the addition circuit 184, where it may be added to the rotation correction output signal $S_{RC\_OUT}$, before ultimately being transmitted, in the form of an acceleration output signal 195, to the inertial force cancellation circuit 206. The acceleration output signal 195 may comprise x-, y-, and/or z-components and may be expressed mathematically by the following formula:

$$a(t) = -(2\pi f)^2 A \sin 2\pi ft + \gamma$$

where a(t) is the acceleration applied to the lens 142 at time t, $(2\pi f)^2$ A is the amplitude of the acceleration output signal 195, f is the frequency of the disturbance signal 128, and γ is the offset error and/or bias presented in the form of an acceleration offset.

The addition circuit 184 may then receive the acceleration output signal 195 from the actuator control circuit 120 and may transmit the acceleration output signal 195 to the offset correction circuit 160 (910). The offset correction circuit 160 may generate an offset-corrected acceleration signal 205, via the calculation circuit 186, that is substantially free from the acceleration offset by subtracting a signal equal in magnitude to the acceleration offset from the acceleration output signal 195. The offset-corrected acceleration signal 205 may be expressed mathematically by the following formula:

$$a(t) = -(2\pi f)^2 A \sin 2\pi f - \gamma + \gamma_{CORR}$$

where a(t) is the acceleration applied to the lens 142 at time t, $(2\pi f)^2$ A is the amplitude of the acceleration, f is the frequency of the disturbance signal 128, γ is the acceleration offset, and $\gamma_{CORR}$ is an offset correction signal equal in magnitude to γ. The offset correction circuit 160 may then transmit the offset-corrected acceleration signal 205 to the phase correction circuit 165 for additional processing.

The system may then correct the phase via at least one digital filter (915), as the offset-corrected acceleration signal 205 received by the phase correction circuit 165 may comprise the phase offset error. Accordingly, the offset-corrected acceleration signal 205 received from the offset correction circuit 160 for each drive axis may be expressed mathematically by the following formula:

$$a(t) = -(2\pi f)^2 A \sin(2\pi ft - \theta)$$

where a(t) is the acceleration applied to the lens 142 at time t, $(2\pi f)^2$ A is the amplitude of the acceleration, f is the frequency of the disturbance signal 128, and θ is an acceleration phase offset error.

The phase correction circuit 165 may apply a phase compensation technique to generate a phase-corrected acceleration signal 215, which may be shifted in phase with respect to the acceleration signal supplied to it from the offset correction circuit 160. To correct the offset-corrected acceleration signal 205 according to certain embodiments, it is desired that a phase offset error of zero be sustained. Accordingly, the phase-corrected acceleration signal 215 may be expressed mathematically by the following expression:

$$a(t) = -(2\pi f)^2 A \sin(2\pi ft - \theta + \theta_{CORR})$$

where a(t) is the acceleration applied to the lens 142 at time t, $(2\pi f)^2$ A is the amplitude of the acceleration, f is the frequency of the disturbance signal 128, θ is the phase offset error, and $\theta_{CORR}$ is a phase offset error correction equal in magnitude to the phase offset error. The phase correction circuit 165 may then transmit the phase-corrected acceleration signal 215 to the inertial force modeling circuit 170 for further processing.

Referring now to FIG. 7, the dashed line shows a state in which the inertial force correction is not enabled. When the system 100 is acted upon by the disturbance signal 128, the lens 142 may experience the inertial force, F. If the correction is not enabled, the lens 142 may, for example, deviate by Δz from the target position. In the case where the actuator 115 is configured as a voice coil motor, the Lorentz force, $F_L$, applied to the lens 142 as a result of applying the disturbance signal 128 to the sensor 105 may be expressed mathematically by the following formula:

$$F_L = IBL$$

where B is the magnetic flux density, I is the applied current, and L is the overall effective length of the coil 152.

Referring again to FIG. 9, the system 100 may calculate the correction signal $S_{CORR}$, such as the correction current $I_{CORR}$, according to the following mathematical formula:

$$I_{CORR} = \frac{F_{CORR}}{BL}$$

where $F_{CORR}$, which is equal in magnitude to the inertial force F, is the correction force applied to the lens 142 by the driver circuit 180.

The inertial force F may be calculated according to the following mathematical formula:

$$F = ma(t)$$

where m is the mass of the lens 142.

Accordingly, the correction current $I_{CORR}$ may be calculated according to the following mathematical formula:

$$I_{CORR} = \frac{ma(t)}{BL}$$

In some embodiments, m, B, and L may be known constants. In other embodiments, B and L may fluctuate. Any suitable signal gain controller, such as an attenuator, amplifier, or the like, may be used to amplify the phase-corrected acceleration signal 215 by one or more of the predetermined coefficients. Accordingly, the coefficients may be determined based on the length of the coil 152, the mass of the lens 142, and the magnetic flux density associated with the coil 152. For example, in the case where two coefficients are used (e.g., in manufacturing/production of different modules, where each module has its own m, B, and L values), one coefficient may be a "characterization" coefficient having a constant value that remains the same for each module, while the other coefficient may be a "calibration coefficient" that may change across the different modules depending on the values of m, B, and L.

Thereafter, the system 100 may transmit the correction current $I_{CORR}$ to the addition circuit 182 for further processing (925).

While the system 100 is performing the inertial force cancellation process (i.e., steps 900 to 925), the gyro filter 155a and the acceleration filter 155b may simultaneously perform various functions on the velocity signal $S_{VEL}$ and the acceleration signal $S_{ACC}$, respectively, such as integration and frequency characteristic adjustment. For example, the gyro filter 155a and the acceleration filter 155b may operate in conjunction with each other to calculate the target position of the lens 142.

The gyro filter 155a may utilize the x-, y-, and/or z-components of the velocity signal $S_{VEL}$ to generate the gyro filter output signal $S_{GF\_OUT}$. The gyro filter output signal $S_{GF\_OUT}$ may be a current signal, such as a gyro filter output current $I_{GF\_OUT}$. The gyro filter 155a may convert various angular velocity components of the velocity signal $S_{VEL}$ to respective shake angles. Each angular velocity component may be associated with one of the x-, y-, and/or z-components of the velocity signal $S_{VEL}$, and each shake angle may be associated with one angular velocity component. The gyro filter 155a and the acceleration filter 155b may then determine the target position of the lens 142 in each direction according to the respective shake angle.

For example, in the case of the y-axis, the gyro filter 155a may compute an integration of the angular velocity around the x-axis to generate its respective shake angle. The gyro filter 155a may then determine the reference target position of the lens 142 in the y-axis direction according to the calculated shake angle. The gyro filter 155a may then transmit the reference target position, in the form of the gyro filter output current $I_{GF\_OUT}$, to another portion of the actuator control circuit 120, such as the addition circuit 182 for further processing.

The acceleration filter 155b may utilize the x-, y-, and z-components of the acceleration output signal 195 to generate the acceleration filter output signal $S_{AF\_OUT}$. The acceleration filter output signal $S_{AF\_OUT}$ may be a current signal, such as an acceleration filter output current $I_{AF\_OUT}$.

For example, the acceleration filter 155b may perform a double-integration of the acceleration output signal 195 to generate a respective position signal of the lens 142. The acceleration filter 155b may then use the position signal to compute a deviation from the target reference position. The acceleration filter 155b may then transmit the computed deviation, in the form of the acceleration filter output current $I_{AF\_OUT}$, to another portion and/or sub-circuit of the actuator control circuit 120, such as the gyro filter 155a, for further processing. The target position, to be set for the lens 142 in the y-axis direction, may be computed by adding or otherwise subtracting the computed deviation to or from the reference target position depending on the direction in which the disturbance signal 128 is applied to the system 100. This process may be repeated for the x and z-axis directions.

The gyro filter 155a and the acceleration filter 155b may then transmit the gyro filter output current $I_{GF\_OUT}$ and the acceleration filter output current $I_{AF\_OUT}$, respectively, to the addition circuit 182 where each may be added to the correction current $I_{CORR}$. The addition circuit 182 may then transmit the resulting summed current, in the form of the drive current $I_{DR}$, to the SSCGA circuit 175. Once the drive current $I_{DR}$ is received from the addition circuit 182, the SSCGA circuit 175 may apply the stroke sensitivity correction gain $A_S$ to the drive current $I_{DR}$ to generate the corrected drive current $I_{DR\_CORR}$. The driver circuit 180 may then transmit the resulting corrected drive current $I_{DR\_CORR}$ to the actuator 115 via the driver circuit 180.

Once the actuator 115 receives the corrected drive current $I_{DR\_CORR}$, it may convert the corrected drive current $I_{DR\_CORR}$ to a corresponding corrected drive force $F_{DR\_CORR}$. The driver circuit 180 may then apply the corrected drive force $F_{DR\_CORR}$ to the lens 142 in a direction opposite to that of the inertial force F, thereby substantially canceling the inertial force F.

After completion of the inertial force cancellation process, another iteration of a program loop may be executed by the system 100 (930).

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A control circuit, comprising:
   a first circuit portion capable of receiving a first input signal and generating a drive signal according to the first input signal;
   a driver circuit configured to transmit the drive signal; and
   a second circuit portion connected to the driver circuit via a feedback line and an output terminal of the first circuit portion and capable of receiving a second input signal via the feedback line, comprising:
      a first amplifier configured to amplify the second input signal;
      an analog-to-digital converter (ADC) configured to convert the amplified second input signal to a corresponding digital second input signal;

a filter connected to the ADC and configured to generate a filtered digital second input signal comprising a first peak and a second peak;
a fourth sub-circuit configured to measure a difference value between the first peak and the second peak;
a fifth sub-circuit configured to produce a correction gain according to the measured difference value and a predetermined difference value; and
a second amplifier connected between the first circuit portion and the driver circuit and configured to apply the correction gain to the drive signal.

2. The control circuit of claim 1, wherein the driver circuit is further configured to apply a step current over a first time period, and wherein the step current decreases from a predetermined current value to zero over the first time period.

3. The control circuit of claim 2, further comprising a memory configured to store the predetermined current value and accessible to the second circuit portion.

4. The control circuit of claim 3, further comprising a voltage detection circuit connected to the driver circuit and configured to:
detect an induced voltage; and
transmit the second input signal to the second circuit portion according to the detected induced voltage.

5. The control circuit of claim 2, wherein:
the filtered digital signal is generated over a second time period;
the second time period immediately follows the first time period;
the first peak follows the end of the first time period by a first portion of the second time period; and
the second peak follows the first peak by a second portion of the second time period.

6. The control circuit of claim 1, wherein the filter is a band pass filter configured to:
attenuate a portion of the digital signal in a first range of frequencies, wherein the first range of frequencies comprises near-DC frequencies;
pass a portion of the digital signal in a second range of frequencies, wherein the second range of frequencies comprises a first resonance frequency; and
attenuate a portion of the digital signal in a third range of frequencies, wherein the third range of frequencies comprises a second resonance frequency.

7. The control circuit of claim 1, wherein the fifth sub-circuit is further configured to compute a ratio according to the measured difference value and the predetermined difference value.

8. The control circuit of claim 7, wherein the fifth sub-circuit is further configured to compute the correction gain based on the computed ratio, and wherein the correction gain is equal to the square root of the ratio.

9. A method for calibrating a drive signal, comprising:
receiving an analog input signal;
amplifying, via an amplifier, the analog input signal;
converting, via an analog-to-digital converter (ADC), the amplified analog input signal to a corresponding digital input signal;
generating a filtered digital input signal from the digital input signal, wherein the filtered digital input signal comprises a first peak and a second peak;
measuring a difference value between the first and the second peak;
computing a correction gain according to the measured difference value and a predetermined difference value; and generating the drive signal according to:
the input signal; and
the correction gain.

10. The method of claim 9, further comprising:
applying a step current to an actuator over a first time period, wherein the step current decreases from a predetermined current value to zero over the first time period;
detecting an induced voltage of the actuator, wherein the actuator generates the induced voltage from the step current; and
generating the analog input signal according to the induced voltage.

11. The method of claim 9, wherein:
the filtered digital input signal is generated over a second time period;
the second time period immediately follows the first time period;
the first peak follows the end of the first time period by a first portion of the second time period; and
the second peak follows the first peak by a second portion of the second time period.

12. The method of claim 9, wherein generating the filtered digital input signal comprises:
attenuating the digital input signal in a first range of frequencies, wherein the first range of frequencies comprises DC frequencies;
passing the digital input signal in a second range of frequencies, wherein the second range of frequencies comprises a first resonance frequency; and
attenuating the digital input signal in a third range of frequencies, wherein the third range of frequencies comprises a second resonance frequency.

13. The method of claim 9, wherein computing the correction gain comprises computing a ratio, and wherein the ratio is equal to the predetermined difference value divided by the measured difference value.

14. The method of claim 13, wherein the correction gain is equal to the square root of the ratio.

15. A system, comprising:
a sensor capable of generating a signal;
an actuator responsive to a drive signal;
a control circuit capable of controlling the actuator, comprising:
a first circuit portion capable of receiving a first input signal and generating the drive signal according to the first input signal;
a driver circuit connected to the actuator and configured to apply the drive signal to the actuator; and
a second circuit portion connected to an output terminal of the first circuit portion and the actuator via a feedback line and capable of receiving a second input signal via the feedback line, comprising:
a first amplifier configured to amplify the second input signal;
an analog-to-digital converter (ADC) configured to convert the amplified second input signal to a corresponding digital second input signal;
a filter connected the ADC and configured to generate a filtered digital second input signal comprising a first peak and a second peak;
a fourth sub-circuit configured to measure a difference value between the first peak and the second peak;
a fifth sub-circuit configured to produce a correction gain according to the measured difference value and a predetermined difference value; and a second amplifier connected between the first circuit portion and the driver circuit and configured to apply the correction gain to the drive signal.

16. The system of claim 15, wherein the driver circuit is further configured to apply a step current to the actuator over a first time period, and wherein the step current decreases from a predetermined current value to zero over the first time period.

17. The system of claim of claim 16, further comprising a voltage detection circuit connected to the driver circuit and the actuator and configured to:
  detect an induced voltage of the actuator, wherein the actuator generates the induced voltage from the step current; and
  transmit the second input signal to the second circuit portion according to the induced voltage.

18. The system of claim 16, wherein:
  the filtered digital input signal is generated over a second time period;
  the second time period immediately follows the first time period;
  the first peak follows the end of the first time period by a first portion of the second time period;
  the second peak follows the first peak by a second portion of the second time period; and
  the measured difference value is the largest difference value.

19. The system of claim 15, wherein the second circuit portion is further configured to compute a ratio according to the measured difference value and the predetermined difference value, and wherein the ratio is equal to the predetermined difference value divided by the measured difference value.

20. The system of claim 19, wherein the second circuit portion is further configured to compute the correction gain based on the computed ratio, and wherein the correction gain is equal to the square root of the ratio.

* * * * *